US011072949B2

(12) United States Patent
Strole et al.

(10) Patent No.: US 11,072,949 B2
(45) Date of Patent: Jul. 27, 2021

(54) POWERED LATCH MECHANISM WITH MANUAL RELEASE

(71) Applicant: STRATTEC SECURITY CORPORATION, Milwaukee, WI (US)

(72) Inventors: Michael Strole, Royal Oaks, MI (US); Nicholas Schafer, Milwaukee, WI (US); Julie Zier, West Bend, WI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 819 days.

(21) Appl. No.: 15/714,278

(22) Filed: Sep. 25, 2017

(65) Prior Publication Data

US 2018/0087298 A1    Mar. 29, 2018

Related U.S. Application Data

(60) Provisional application No. 62/398,993, filed on Sep. 23, 2016.

(51) Int. Cl.
   *E05B 81/90*     (2014.01)
   *E05B 81/20*     (2014.01)
   (Continued)

(52) U.S. Cl.
   CPC ............ *E05B 81/90* (2013.01); *B62D 33/037* (2013.01); *E05B 81/16* (2013.01); *E05B 81/20* (2013.01);
   (Continued)

(58) Field of Classification Search
   CPC .......... E05B 81/90; E05B 81/06; E05B 81/14; E05B 81/18; E05B 81/20; E05B 81/34;
   (Continued)

(56) References Cited

U.S. PATENT DOCUMENTS 2,439,941 A * 4/1948 Lounsbury ............. B61H 13/04
                                                    74/505
5,101,684 A * 4/1992 Mosslacher .............. B60J 7/057
                                                    296/223

(Continued)

FOREIGN PATENT DOCUMENTS

DE    102015107955 A1 * 11/2016  ............. E05B 81/90
GB       2376501 A  * 12/2002   ............. E05B 81/14

*Primary Examiner* — Christine M Mills
(74) *Attorney, Agent, or Firm* — Michael Best & Friedrich LLP

(57) ABSTRACT

A powered latch with manual release includes a forkbolt, a detent lever, and a powered actuator. The forkbolt is pivotable about a first axis to latch and unlatch a striker. The detent lever is pivotable about a second axis and engageable with the forkbolt to secure the forkbolt in the latched position. A power cinching lever is rotatable by the powered actuator to cinch the forkbolt to the latched position. A power release lever is rotatable by the powered actuator to release the detent lever from the forkbolt. A manual release lever is supported for rotation about a third axis and operable by a single manual rotation from outside the powered latch, without operation of the powered actuator, to both: interrupt a power transmission path between the powered actuator and the power cinching lever, and drive the detent lever to release the forkbolt.

20 Claims, 13 Drawing Sheets

(51) Int. Cl.
 *E05B 81/16* (2014.01)
 *B62D 33/037* (2006.01)
 *E05B 81/34* (2014.01)
 *E05B 81/36* (2014.01)
 *E05B 83/18* (2014.01)

(52) U.S. Cl.
 CPC .............. *E05B 81/34* (2013.01); *E05B 81/36* (2013.01); *E05B 83/18* (2013.01)

(58) Field of Classification Search
 CPC .......... E05B 81/30; E05B 81/36; E05B 81/16; E05B 83/18; Y10T 292/1082; Y10T 292/1047; Y10T 292/1079; Y10S 292/23; B62D 33/037
 See application file for complete search history.

(56) References Cited

U.S. PATENT DOCUMENTS

| | | | |
|---|---|---|---|
| 5,232,253 A | 8/1993 | Tamiya | |
| 5,639,130 A * | 6/1997 | Rogers, Jr. | E05B 81/20 292/199 |
| 5,876,074 A | 3/1999 | Dowling | |
| 5,951,070 A * | 9/1999 | Spurr | E05B 81/25 292/201 |
| 6,053,542 A * | 4/2000 | Ostrowski | E05B 81/20 292/201 |
| 6,123,372 A * | 9/2000 | Rogers, Jr. | E05B 81/20 292/201 |
| 6,499,776 B2 * | 12/2002 | Takamura | E05B 81/20 292/201 |
| 6,550,825 B2 * | 4/2003 | Ostrowski | E05B 81/20 292/199 |
| 6,669,247 B2 * | 12/2003 | Swan | E05B 81/14 292/201 |
| 6,918,275 B2 | 7/2005 | Martus et al. | |
| 7,232,161 B2 * | 6/2007 | Matsuda | E05B 81/06 292/100 |
| 7,472,628 B2 * | 1/2009 | Oberheide | F16D 11/14 192/69.8 |
| 9,428,943 B2 * | 8/2016 | Mitchell | E05B 85/02 |
| 10,094,147 B2 * | 10/2018 | Lujan | E05C 19/12 |
| 10,280,653 B2 * | 5/2019 | Estrada | E05B 77/12 |
| 10,378,252 B2 * | 8/2019 | Ottino | E05B 81/68 |
| 10,472,869 B2 * | 11/2019 | Fannon | E05B 81/14 |
| 2004/0154364 A1 * | 8/2004 | Dimig | E05B 81/08 70/279.1 |
| 2004/0239124 A1 * | 12/2004 | Larsen | E05B 81/14 292/201 |
| 2005/0156436 A1 * | 7/2005 | Ju | E05B 81/14 292/216 |
| 2006/0131893 A1 * | 6/2006 | Tomaszewski | E05B 81/34 292/216 |
| 2008/0073917 A1 * | 3/2008 | Ciavaglia | E05B 81/20 292/201 |
| 2009/0236863 A1 * | 9/2009 | Akizuki | E05B 81/14 292/201 |
| 2012/0248796 A1 | 10/2012 | Kurebayashi | |
| 2016/0244999 A1 * | 8/2016 | Ottino | E05B 81/68 |
| 2018/0347239 A1 * | 12/2018 | Im | E05B 81/16 |
| 2019/0024420 A1 * | 1/2019 | Nagata | E05B 81/14 |
| 2020/0224465 A1 * | 7/2020 | Nagaoka | E05B 79/04 |

* cited by examiner

POWERED LATCH MECHANISM WITH MANUAL RELEASE

CROSS-REFERENCE TO RELATED APPLICATIONS

This application claims priority to U.S. Provisional Patent Application No. 62/398,993, filed Sep. 23, 2016, the entire contents of which are incorporated by reference herein.

BACKGROUND

The invention relates to latch mechanisms, such as those used in automotive applications including, but not limited to, truck end gates or "tailgates", vehicular rear hatches, lift gates, trunks, and side entry doors.

Electrically-powered release latches have posed a challenge in assembly plants when it becomes necessary to open a door or gate before power is supplied to the vehicle. As such, some latches have been modified with the addition of a dedicated mechanical release device, such as a lever that can be actuated by manually pulling an attached tether. This function becomes significantly more complex when the electric release latch also provides a power cinching function for electrically closing the door or gate, as the cinching mechanism must be disengaged prior to manual release. Thus, power cinching and release latches may employ complex mechanisms for disengaging the cinching mechanism and subsequently releasing the latch, or in some cases, may require destructive disassembly of the latch to disengage the cinching mechanism.

SUMMARY

In one aspect, the invention provides a powered latch including a forkbolt pivotable about a first axis between a latched position for retaining a striker and an unlatched position for releasing the striker. A detent lever is pivotable about a second axis and engageable with the forkbolt to secure the forkbolt in the latched position. A power cinching lever is rotatable by a powered actuator of the latch to cinch the forkbolt to the latched position. A power release lever is operable to release the detent lever from the forkbolt. A manual release lever is supported for rotation about a third axis. The manual release lever is operable by a single manual rotation from outside the powered latch, without operation of the powered actuator, to both: interrupt a power transmission path between the powered actuator and the power cinching lever, and drive the detent lever to release the forkbolt.

In another aspect, the invention provides a powered latch including a forkbolt pivotable about a first axis between a latched position for retaining a striker and an unlatched position for releasing the striker. A detent lever is pivotable about a second axis and engageable with the forkbolt to secure the forkbolt in the latched position. A power cinching lever is rotatable by a powered actuator of the latch to cinch the forkbolt to the latched position. A power release lever is operable to release the detent lever from the forkbolt. A manual release mechanism includes a primary manual release lever and a secondary manual release lever drivable by the primary manual release lever. The primary manual release lever includes a driver portion positioned at a third axis about which the primary manual release lever is rotatably supported. The primary manual release lever is rotatable by a manual rotational input to the driver portion from outside the powered latch, without operation of the powered actuator, to both: interrupt a power transmission path between the powered actuator and the power cinching lever, and drive the detent lever to release the forkbolt.

Other aspects of the invention will become apparent by consideration of the detailed description and accompanying drawings.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
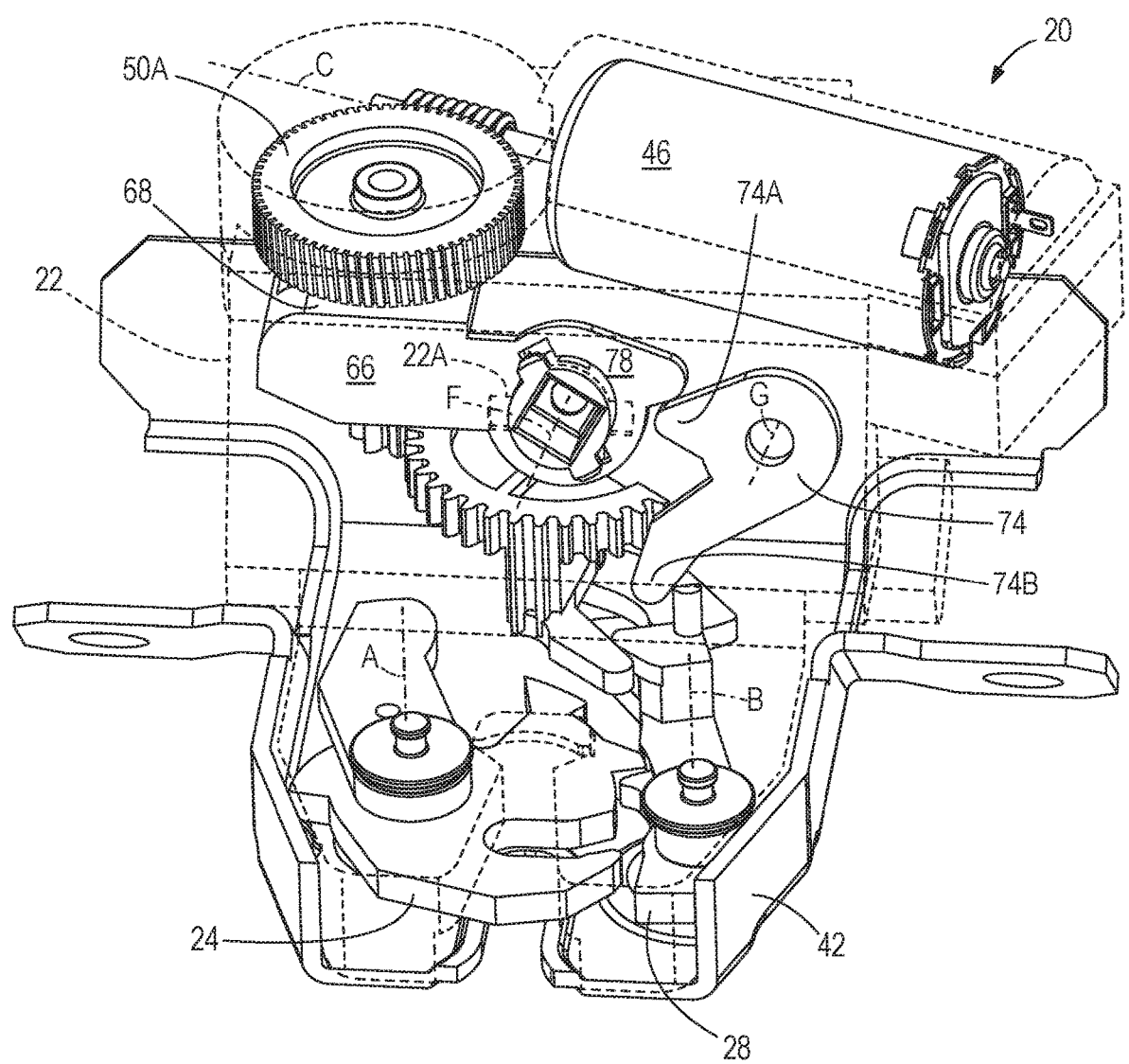
FIG. 1 is a perspective view of a latching assembly according to one embodiment of the present invention.
Figure 2:
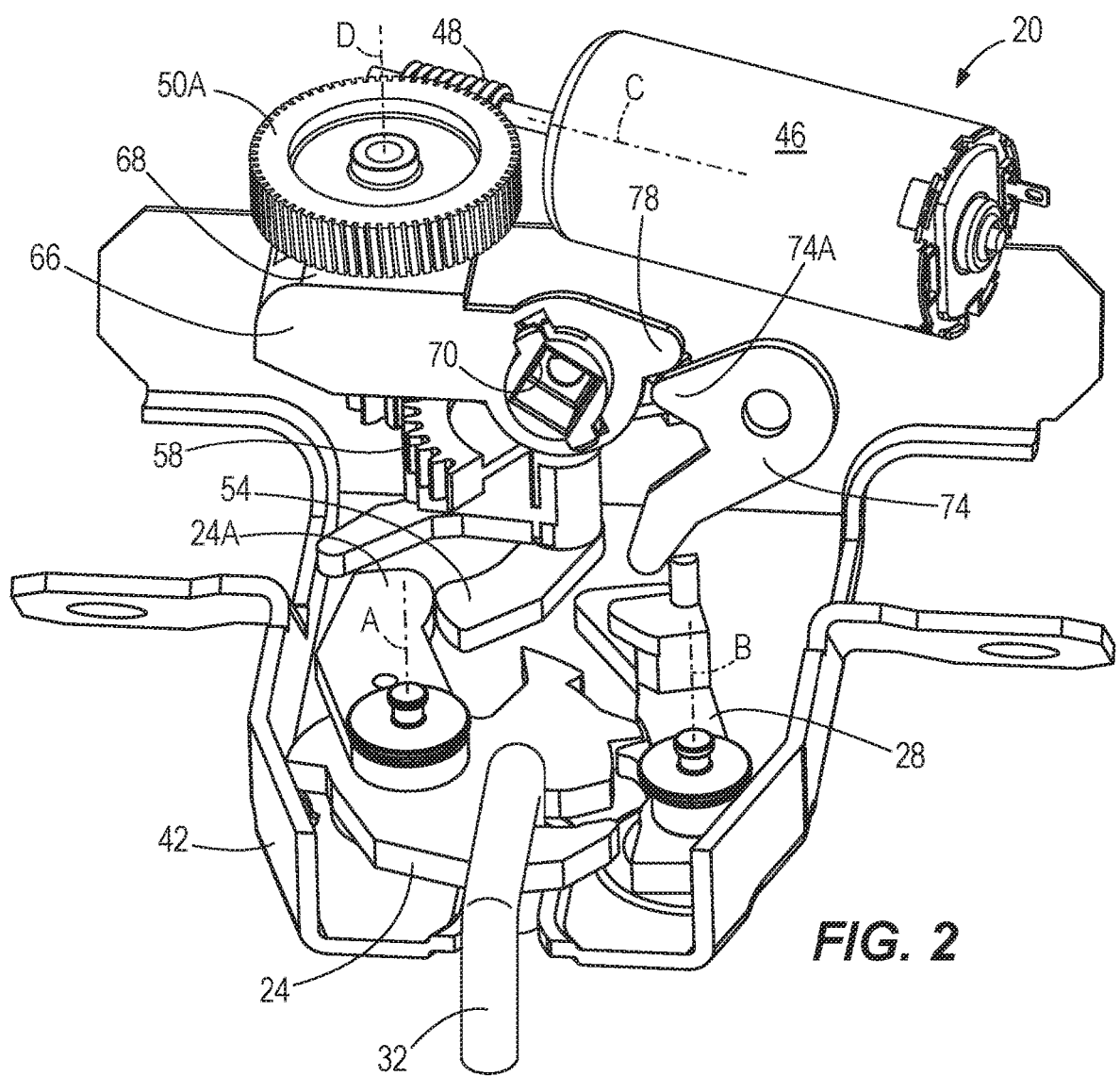
FIG. 2 is a perspective view of the latching assembly of FIG. 1 during a powered cinching operation.

FIGS. 1-6 illustrate a latching assembly, or simply, latch 20 which may be used to selectively hold shut a closure (e.g., a vehicle entry door, hatch, tailgate or end gate, decklid or trunk, and the like). A portion 22 of a housing of the latch 20 is removed in many of the views to illustrate the internal components. The latch 20 includes a catch, referred to herein as forkbolt 24 and a pawl, referred to herein as detent lever 28. The forkbolt 24 is rotatable about a first axis A to selectively engage and trap a striker 32, and the detent lever 28 is positioned adjacent the forkbolt 24 and is pivotable about a second axis B parallel with the first axis A of the forkbolt 24. The forkbolt 24 has a groove 34 (FIG. 3) formed to receive the striker 32. The detent lever 28 has an engagement surface configured to engage one or more corresponding engagement surfaces of the forkbolt 24 to retain the forkbolt 24 in one or more latched positions, retaining the striker 32 as shown in FIGS. 1 and 2. These may include a half-latched or safety-latched position and a fully-latched position. In the case of automotive closures and the like, the striker 32 may be fixed to a body (e.g., door frame, truck bed, or pillar), and the latch 20 may be mounted at the edge of the particular closure that is swingable or slidable relative to the body, although these positions of the striker 32 and latch 20 can be reversed in other embodiments. The forkbolt 24 can be manufactured as a single integral piece or multiple pieces. Working components of the latch 20, including for example the forkbolt 24 and the detent lever 28 can be rotatably supported by a frame plate or latch frame 42 that forms a portion of the housing of the latch 20. An opening in the latch frame 42 allows entry and exit of the striker 32.

Figure 3:
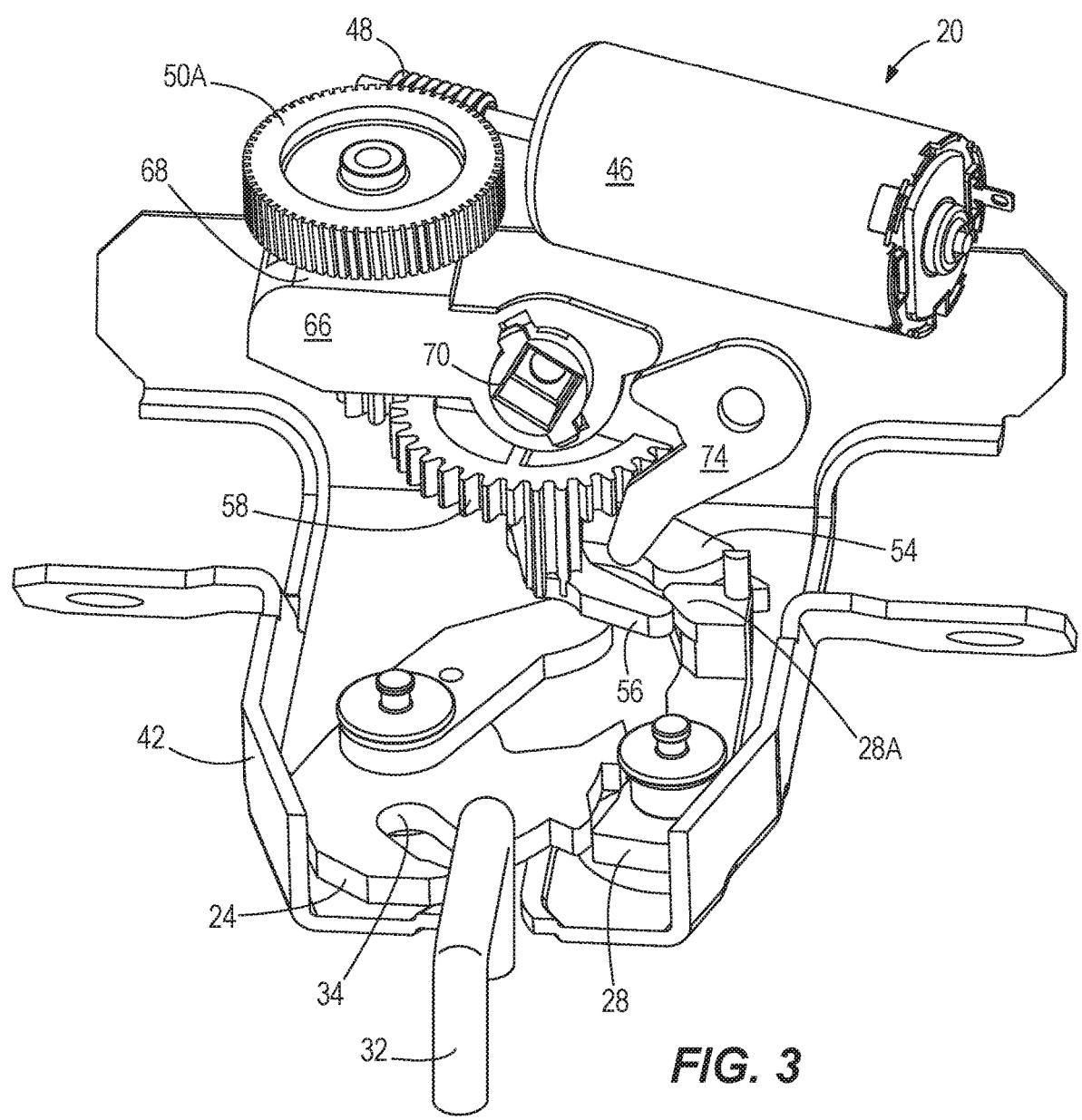
FIG. 3 is a perspective view of the latching assembly during normal powered release operation.

The closure is opened by releasing the detent lever 28 from the engaged position of FIGS. 1 and 2 to the released position of FIG. 3 so that the forkbolt 24 can rotate about the first axis A to free the striker 32. The forkbolt 24 can be biased to a striker-releasing position as in FIG. 3. When the closure is moved toward the closed position, the striker 32 is forced into the groove 34 of the forkbolt 24, thereby rotating the forkbolt 24 toward the latched position of FIGS. 1 and 2. The detent lever 28 can be spring-biased into retaining engagement with the forkbolt 24.

As described in further detail below, the latch 20 is a powered latch assembly. As such, the detent lever 28 can be released or disengaged from the forkbolt 24 by a powered (e.g., electric) actuator, such as the illustrated electric motor 46. The provision of a powered actuator provides that releasing the latch 20 can be accomplished in a normal mode of operation, without applying human power, although human-applied power may be utilized to release the latch in another mode of operation. The motor 46 has an output member or gear, which is a worm 48 in the illustrated construction, although other drive arrangements are optional. The motor 46 drives the worm 48 to rotate about an axis C. The worm 48 is in meshed driving engagement with a first toothed portion, or worm gear portion, 50A of a drive shaft 50. The drive shaft 50 is rotatable about an axis D, which is perpendicular to the axis C of the motor 46 and the worm 48. The drive shaft 50 further includes a second toothed gear portion 50B which is integral with the first toothed portion 50A or is otherwise coupled for rotation therewith.

Figure 2A:
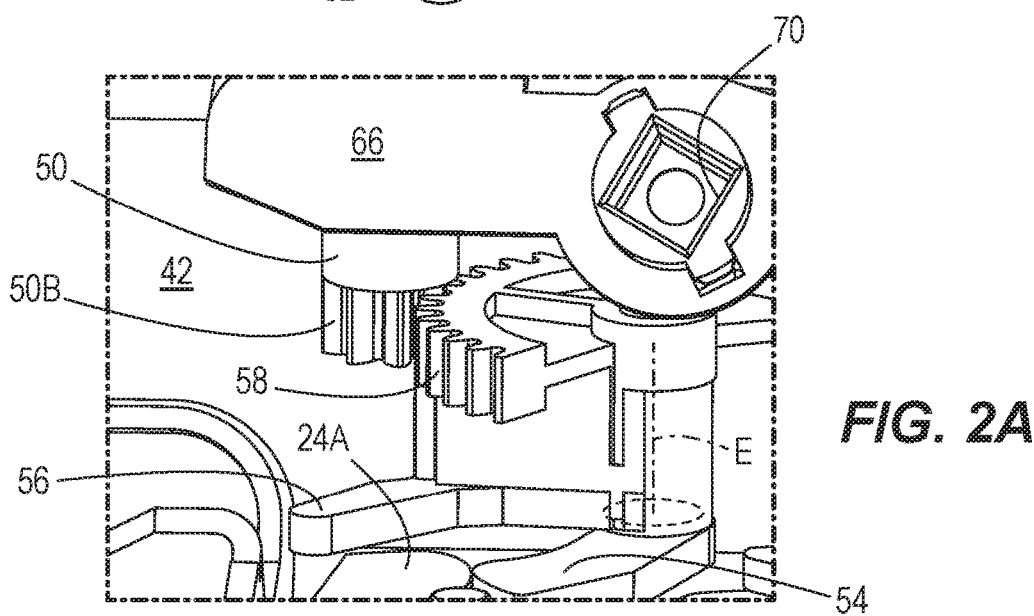
FIG. 2A is a detail view thereof.

The second toothed portion 50B of the drive shaft 50 is operably coupled to drive a power cinching lever 54 and a power release lever 56. As shown in the illustrated construction, the power cinching lever 54 and the power release lever 56 can be secured to a gear 58, for example a sector gear, that is selectively meshed with the second toothed portion 50B of the drive shaft 50. The gear 58 along with the power cinching lever 54 and the power release lever 56 are rotatable about an axis E (FIG. 2A) parallel with the axis D of the drive shaft 50 and perpendicular to the axis C of the motor 46, but alternate arrangements are optional. As shown in FIG. 2, the gear 58 can be driven to rotate in a first direction by the motor 46 and the drive shaft 50 so that the power cinching lever 54 is driven into engagement with a follower portion 24A of the forkbolt 24 such that the forkbolt 24 cinches the striker 32 into a fully latched position. After cinching is complete, the motor 46 can return the power cinching lever 54 back to a "home" position as the latch 20 assumes the state of FIG. 1. The cinching action may initiate automatically (e.g., by a microprocessor or other controller) in response to the striker 32 being brought into initial latching engagement with the forkbolt 24. The controller then actuates the motor 46 to apply the cinching force to complete the latching operation as described above.

As shown in FIG. 3, the gear 58 can be driven to rotate in a second direction, opposite the first direction, by the motor 46 and the drive shaft 50 so that the power release lever 56 is driven into engagement with a first follower portion 28A of the detent lever 28 such that the detent lever 28 releases the forkbolt 24, and thus, the forkbolt 24 releases the striker 32 to open the latch. During normal operation, the power release can be directed by the controller at the command of a vehicle operator control. In additional constructions, the power release lever 56 may be actuated by a powered actuator (e.g., electric motor) that is separate from the motor 46, and optionally located exterior to the latch 20.

Figure 4:
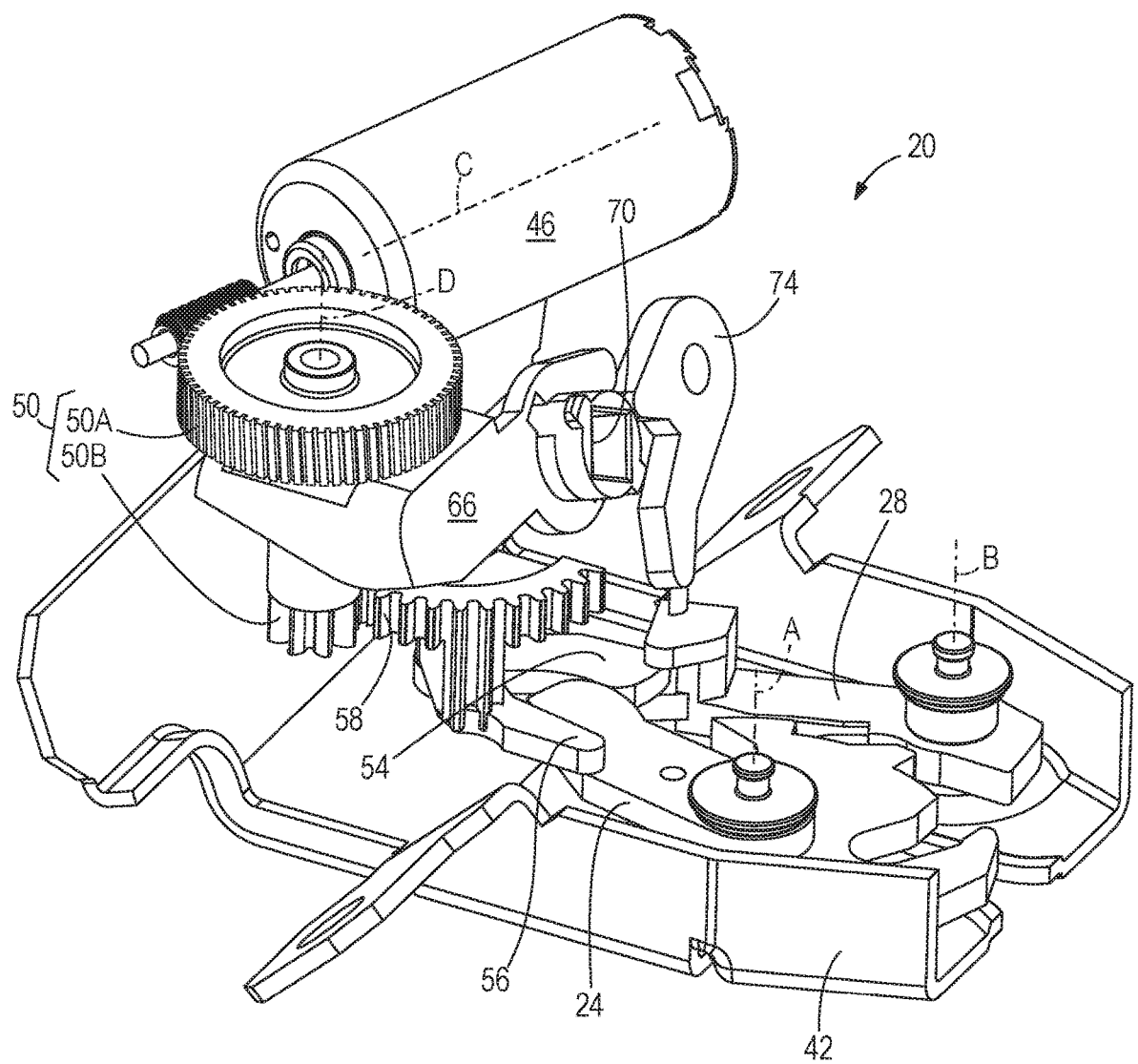
FIG. 4 is a perspective view of the latching assembly during a jammed cinching operation.

Although the latch 20 provides a powered release function as described above, an additional mechanism, separate from the power release lever 56, provides a manual release function. The manual release function can be utilized during the assembly phase (e.g., where the latch 20 is provided on a vehicle closure and the vehicle is undergoing initial factory assembly at an assembly plant) where power (e.g., electric power) may not yet be established to the latch 20. However, the manual release function may also be available at other times, due to other circumstances. For example, a vehicle operator or service technician may utilize the manual release function where vehicle battery power is too low for normal powered actuation, or power from the battery is not reaching the latch 20, or another malfunction has occurred which inhibits the normal powered release of the latch 20. One such circumstance is illustrated in FIG. 4 in which a powered cinching operation is started, but fails to complete (e.g., due to insufficiency or interruption of electrical power), leaving the latch 20 in a jammed condition as the power cinching lever 54 remains engaged with the forkbolt 24 with the forkbolt 24 not having been driven to the fully latched position.

Figure 5:
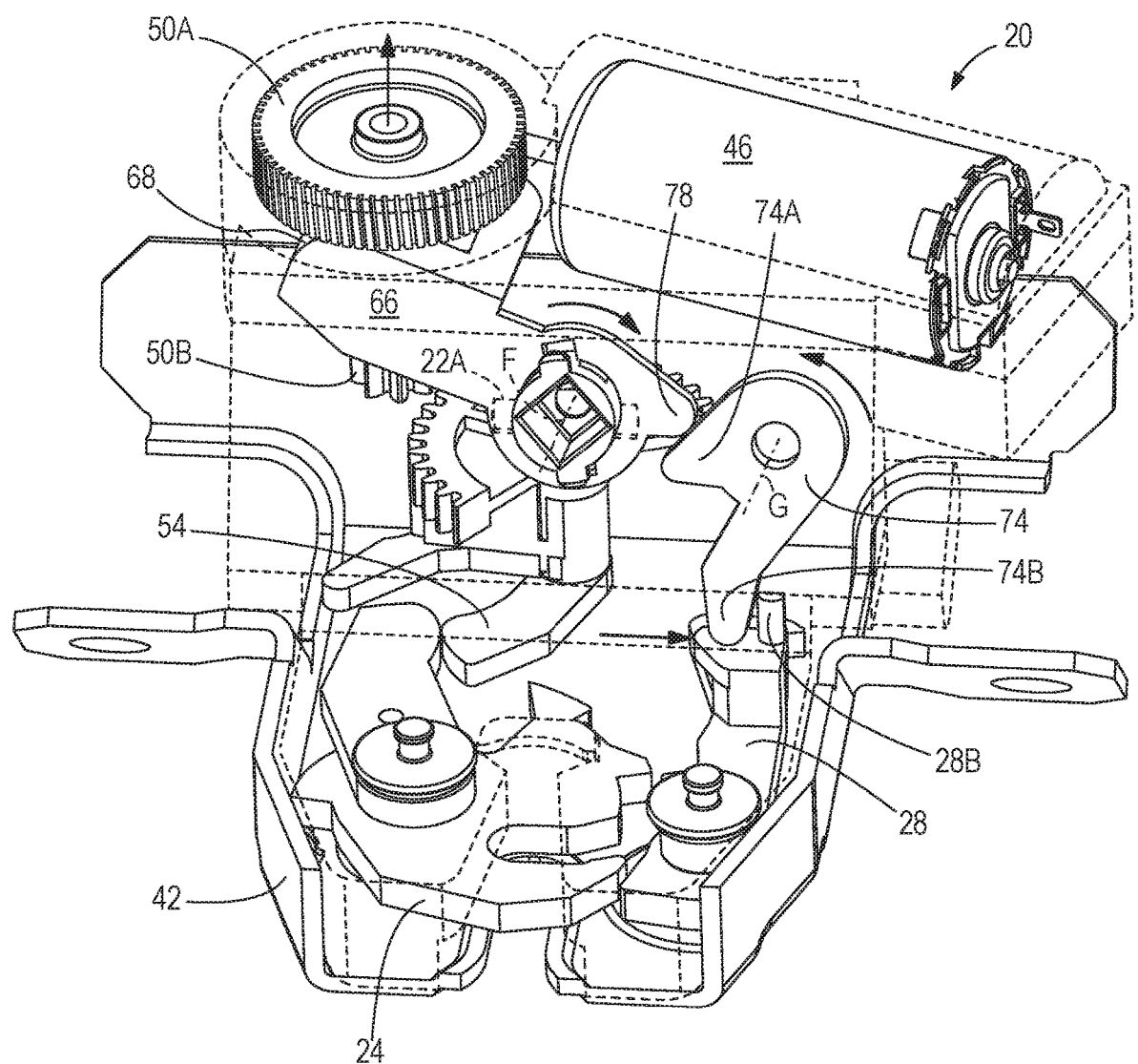
FIG. 5 is a perspective view of the latching assembly during a manual release operation.
Figure 6:
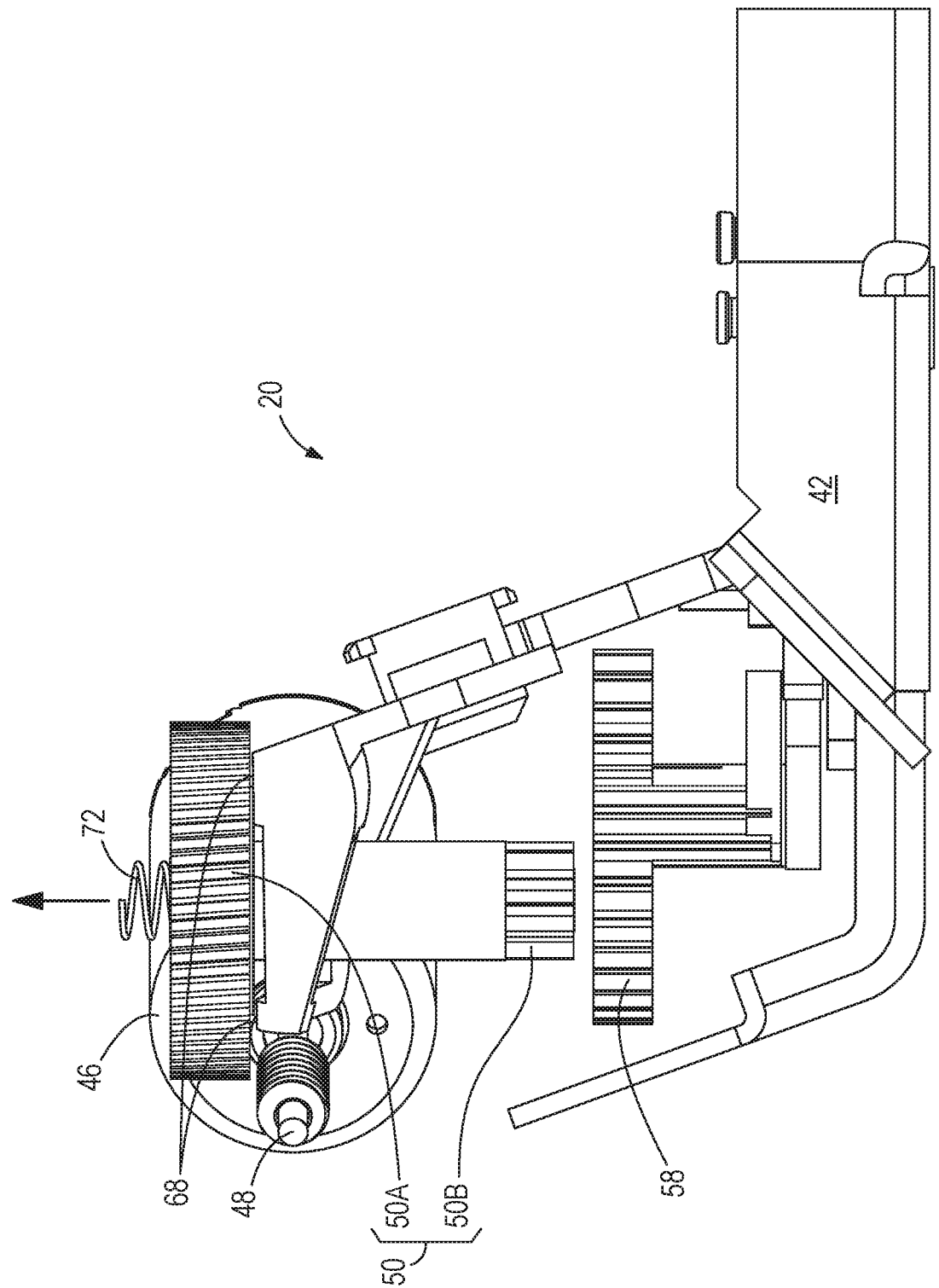
FIG. 6 is a side view of the latching assembly during manual release operation, showing a driven worm gear lifted out of engagement from a motor output worm.

As shown in FIGS. 5 and 6, the manual release function is accomplished by a single input action to a manual release mechanism including a manual release lever 66 movable from a first orientation, referred to herein as a home position (FIGS. 1-4) to a second orientation, referred to herein as a manual release position (FIGS. 5 and 6). The input for manual release can be a rotational input in a single direction. The unidirectional rotational input can be supplied from a hand-held tool (not shown) that is engaged with the manual release lever 66, e.g., a square-drive tool inserted into a socket 70 of the manual release lever 66. The socket 70, or another form of driver portion, can be exposed to an exterior of the latch 20. For example, the driver portion can be exposed and accessible through the housing portion 22, e.g., through an opening 22A in the housing portion that exposes and/or allows outward protrusion of the driver portion without also exposing the manual release lever 66 in full, nor the remaining latch elements. The driver portion can be integrally formed with the manual release lever 66 as a single piece or separately formed. Rotation of the manual release lever 66 (clockwise in FIG. 5) to the manual release position lifts the drive shaft 50 along its axis D so that the driving meshed engagement between the motor 46 and the gear 58 is de-coupled. It is noted that the de-coupling refers in this example to a de-meshing or physical separation, and not merely to backward driving of the levers and/or gear train of a cinching mechanism. In any case, the effect of actuating the manual release lever 66 is interrupting the drive train between the motor 46 and the power cinching lever 54, putting the drive train into a severed or non-drivable state. The manual release lever 66 can lift the drive shaft 50 by a pushing or camming action of a first cam portion 68, against the bias of a spring 72 as shown in FIG.

6. In cases where the latch 20 is in a jammed state, the motor 46 must be de-coupled to re-set the latch 20 since the worm 48 and the motor 46 have a high resistance to being back-driven by the gear 58. Rotation of the manual release lever 66 to the manual release position also simultaneously actuates a secondary manual release lever 74, or simply "secondary lever", in the form of a bell crank for releasing the detent lever 28 from the forkbolt 24.

The secondary lever 74 can have a follower portion 74A provided by a first lever arm that is engaged and driven by a second cam portion 78 of the manual release lever 66, which can be considered the "primary" manual release lever. The manual release lever 66 and the secondary lever 74 can rotate in opposite directions about parallel axes F, G (FIG. 1) when the manual release lever 66 is rotated to the manual release position. When the secondary lever 74 is rotated in response to the manual release lever 66 being rotated to the manual release position, a cam portion 74B provided by a second lever arm of the secondary lever 74 engages a follower portion 28B of the detent lever 28 to drive the detent lever 28 out of engagement with the forkbolt 24. With the detent lever 28 disengaged, the forkbolt 24 can return, for example by spring bias, to the released or open position of FIG. 3. Normal operation of the latch 20 may resume without having to perform any destructive acts upon the latch 20, or even partial disassembly of the latch 20 to resolve the condition of a jammed cinching operation. All that may be required to access the manual release lever 66, particularly the socket 70 or other driver portion, is removal or displacement of a vehicle trim panel and/or a dedicated cover or plug of the vehicle or the latch 20 that does not affect the latch functionality. It should be understood that manual operation of the manual release lever 66 as discussed herein refers to manipulation carried out by means other than the designated powered actuator (e.g. motor 46) of the latch 20, including direct or indirect manipulation by human hands. Further, it is noted that the manual release operation or method is accomplished by supplying rotational input to the manual release lever 66 about the axis F, which is fixed with respect to any or all of: the housing portion 22, the latch frame 42, and the motor 46, for example.

Figure 7:
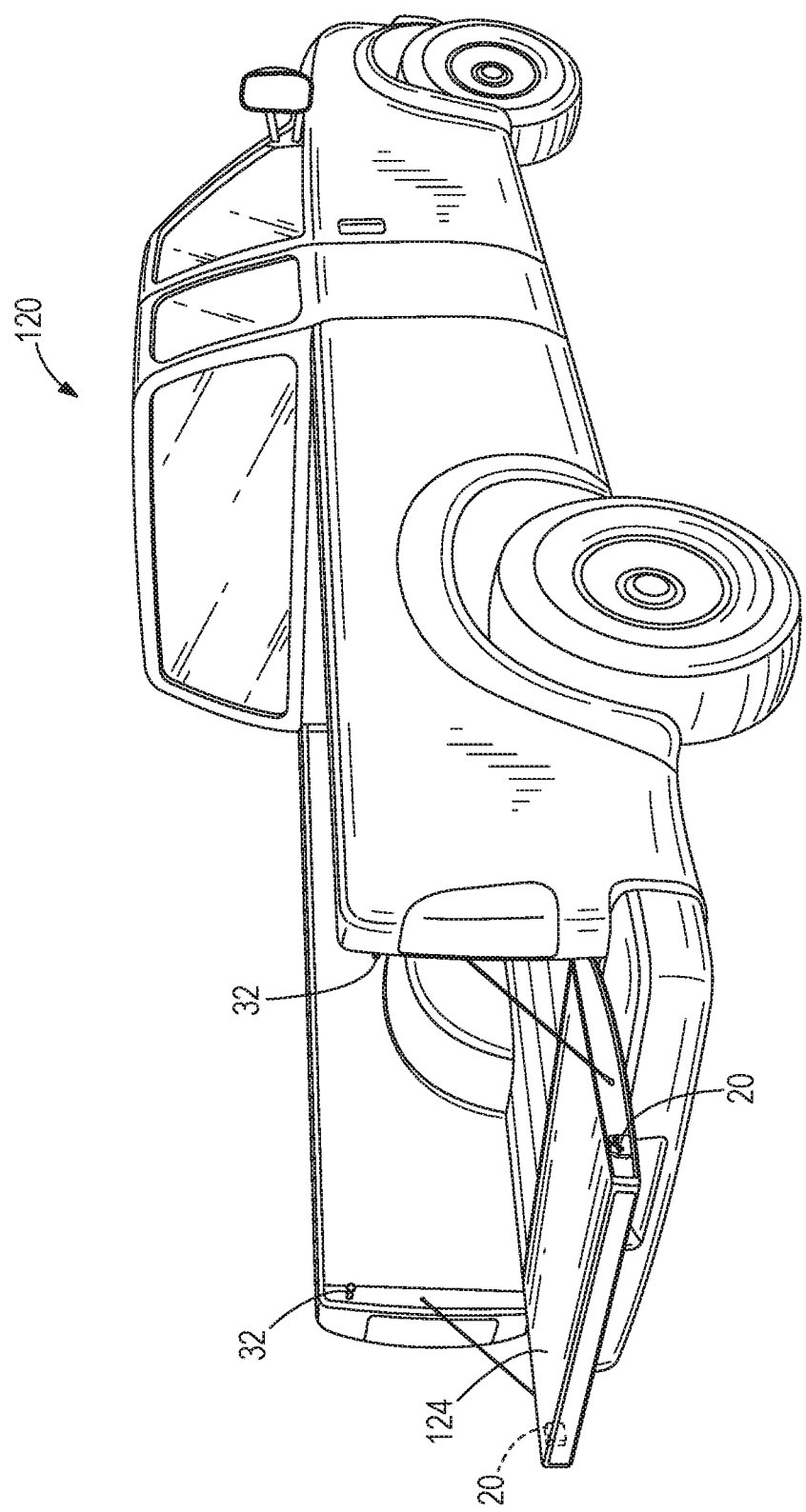
FIG. 7 is a perspective view of a vehicle having the latching assembly of FIG. 1.

With specific reference to FIG. 7, one particular vehicle application of the latch 20 is discussed. As shown, a pickup truck 120 is provided with a cargo bed closable via an end gate 124 pivotally mounted to the cargo bed in a conventional manner. An opening of the cargo bed is provided with a striker 32 at each side. A latch 20 according to the above description is provided at each corresponding side of the end gate 124, so as to be selectively engageable with the respective striker 32. Thus, the two latches 20 cooperate together to selectively hold the end gate 124 in a securely closed position with respect to the cargo bed. As noted above, the strikers 32 may be provided on the end gate 124, and the latches 20 may be provided on the cargo bed, in an alternate construction. During the vehicle assembly phase when power to the latch 20 is not provided (e.g., no voltage source connected to the motor 46), the manual release lever 66 may be rotated to the manual release position to open the end gate 124. Thus, the end gate 124 can be released or unlatched from the cargo bed in a simple, manual operation of the latch 20, despite the latch 20 being provided as a powered latch. This is merely one exemplary type of vehicle and one exemplary type of closure among many possible uses for the latch 20 of FIGS. 1-6. The latch 220 of FIGS. 8-11, described in detail below, can also be used with the end gate 124 of the truck 120 of FIG. 7, among other types of closures.

In another construction, shown in FIGS. 8-11, a latch 220 is provided that has all the same elements and functional features of the latch 20 of FIGS. 1-6, with the exceptions noted below. For brevity, reference is hereby made to the above description of the features of the latch 20 of FIGS. 1-6. The normal operations of power releasing and power cinching are the same as that of the latch 20, but the latch 220 of FIGS. 8-11 is provided with a unique manual release mechanism, which is operated with two distinct inputs. The manual release mechanism includes a manual release lever 266 supported for rotation and having a driver portion such as a socket 70 for receiving a handheld manually-operated tool. The socket 70, or other driver portion of the manual release lever 266, can be exposed to an exterior of the latch 220, e.g., exposed and accessible through the housing portion 22. The manual release mechanism further includes a secondary manual release lever 274, or simply "secondary lever", that is coupled for selective rotation with the manual release lever 266, which can be considered the "primary" manual release lever. The secondary lever 274 is supported for rotation about a common axis F with the manual release lever 266 and includes a follower portion in the form of an oversized slot 274A drivable by a drive portion 278 of the manual release lever 266. The drive portion 278 can be provided as a pin or a post extending as a projection into the slot 274A. In the home position of FIG. 8, the drive portion 278 can be at one extent of the slot 274A so that clockwise rotation of the manual release lever 266 does not drive the secondary lever 274 as the drive portion 278 moves freely within the slot 274A.

Figure 8:
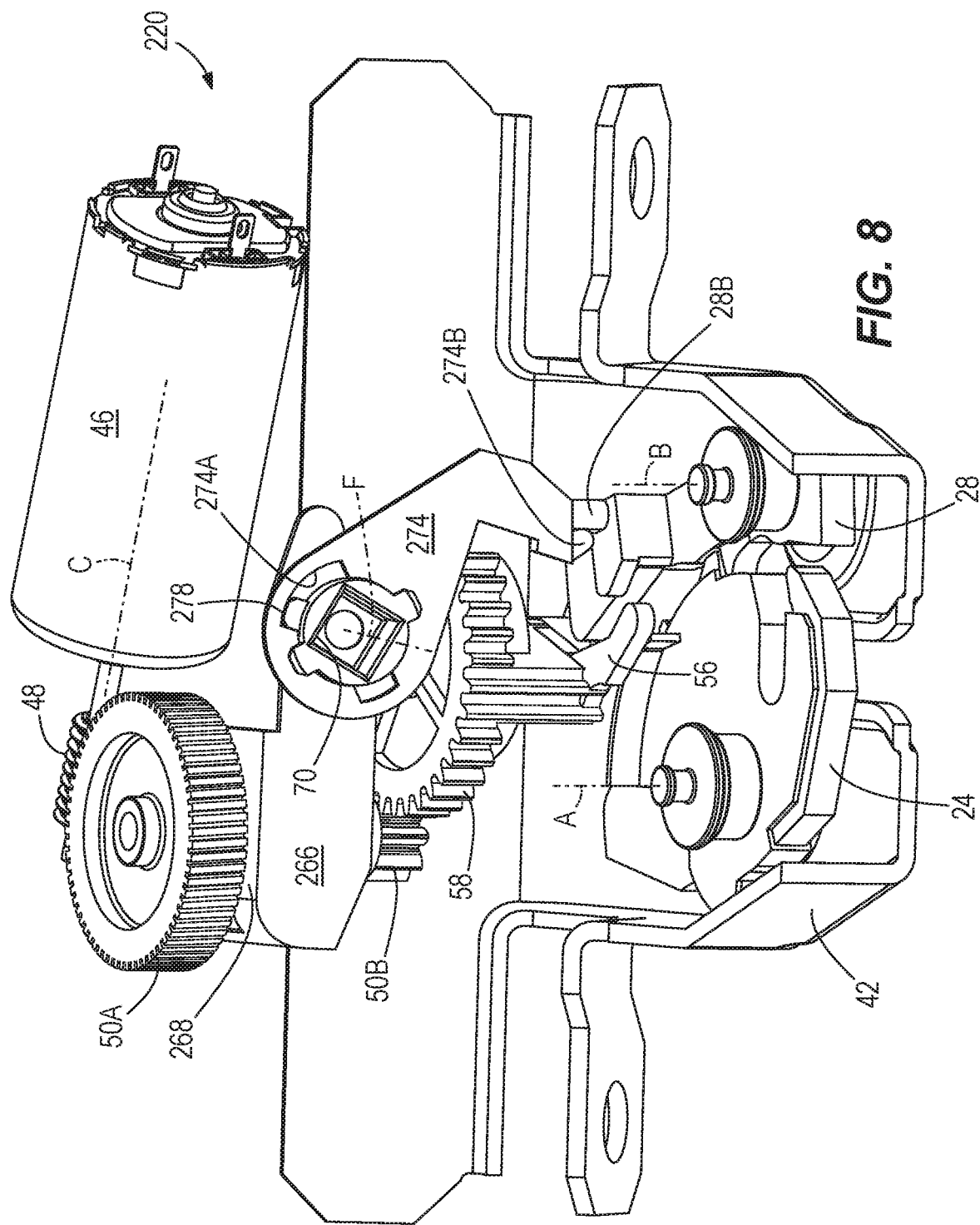
FIG. 8 is a perspective view of a latching assembly according to another embodiment of the present invention.
Figure 9:
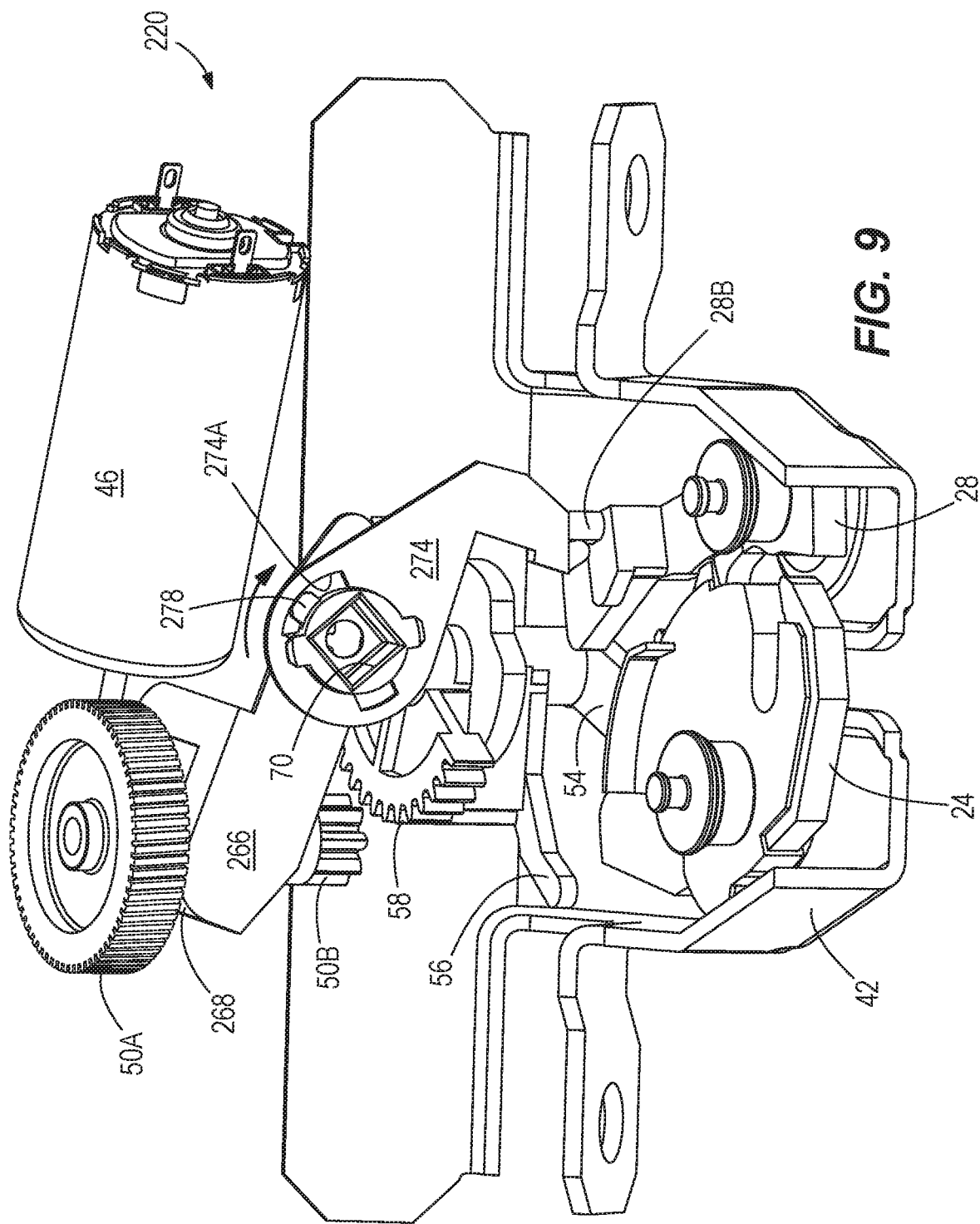
FIG. 9 is perspective view of the latching assembly of FIG. 8, illustrating a first step of a manual release operation.
Figure 10:
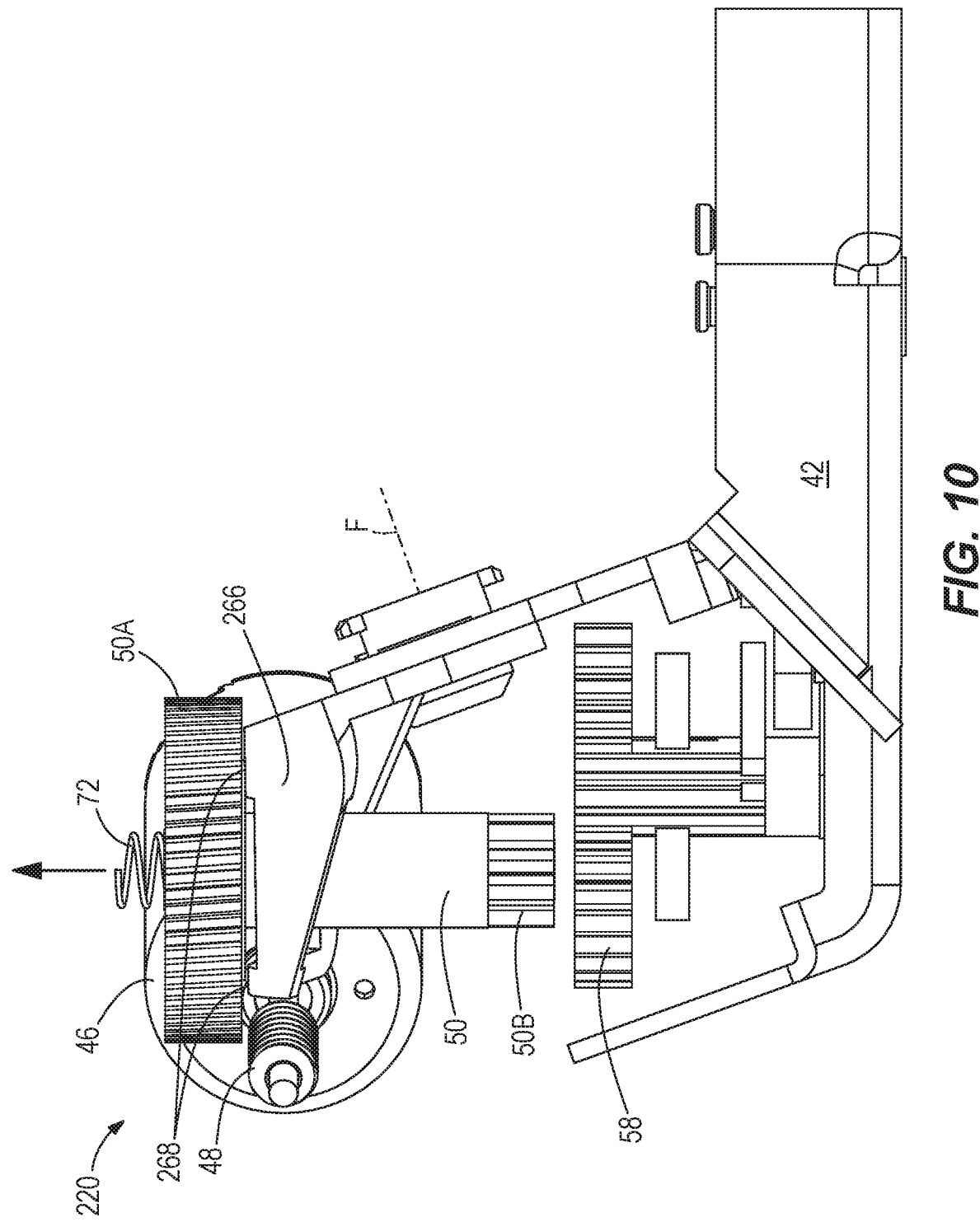
FIG. 10 is a side view of the latching assembly during the manual release operation of FIG. 9 where a driven worm gear is lifted out of engagement from a motor output worm.
Figure 11:
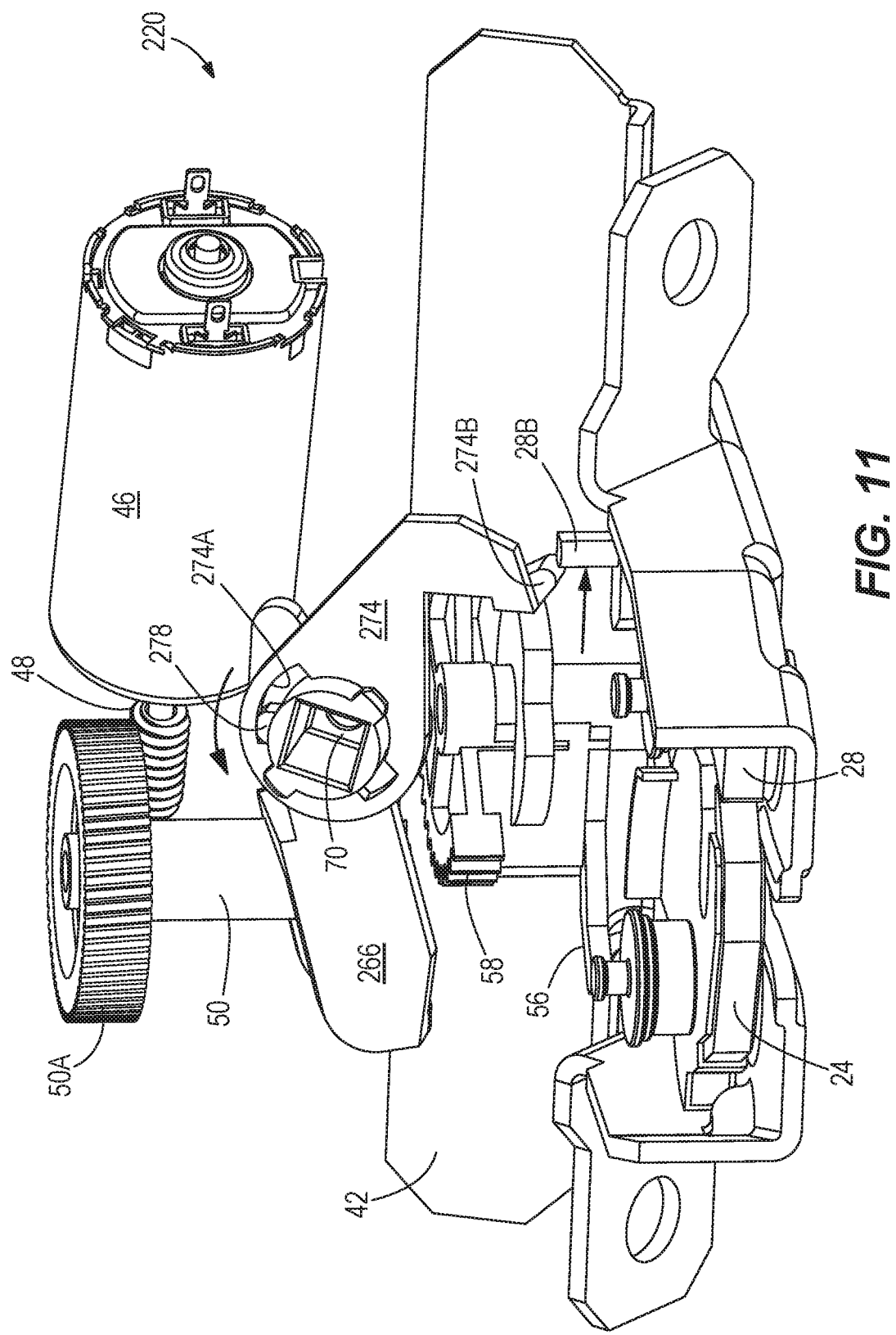
FIG. 11 is a perspective view of the latching assembly of FIG. 8, illustrating a second step of a manual release operation

The manual release function of the latch 220 is accomplished by sequential input actions to the manual release lever 266 from the home position of FIG. 8, first to an orientation referred to herein as a first manual release position (FIGS. 9 and 10), and then to an orientation referred to herein as a second manual release position (FIG. 11). The first input for manual release can be a rotational input in a first direction, provided by a hand-held tool (not shown) inserted into the socket 70 of the manual release lever 266. Rotation of the manual release lever 266 (clockwise as shown in FIG. 9) to the first manual release position lifts the drive shaft 50 along its axis D so that the driving meshed engagement between the motor 46 and the gear 58 is de-coupled. It is noted that the de-coupling refers in this example to a de-meshing or physical separation, and not merely to backward driving of the levers and/or gear train of a cinching mechanism. In any case, the effect of actuating the manual release lever 266 is interrupting the drive train between the motor 46 and the power cinching lever 54, putting the drive train into a severed or non-drivable state. The manual release lever 266 can lift the drive shaft 50 by a pushing or camming action of a first cam portion 268, against the bias of a spring 72 as shown in FIG. 10. In cases where the latch 220 is in a jammed state, the motor 46 must be de-coupled to re-set the latch 220 since the worm 48 and the motor 46 have a high resistance to being back-driven by the gear 58. Rotation of the manual release lever 266 to the first manual release position has no effect on the secondary lever 274, which remains in the home position.

After the geared engagement to the motor 46 has been de-coupled, the second actuation of the manual release lever 266 can be carried out for releasing the detent lever 28 from the forkbolt 24. After returning the manual release lever 266 to the home position, by rotation back from the first manual release position, the manual release lever 266 is rotated further counter-clockwise as shown in FIG. 11 to the second manual release position. Because of the arrangement of the drive portion 278 of the manual release lever 266 within the slot 274A, the secondary lever 274 rotates together with the manual release lever 266 from the home position to the second manual release position of FIG. 11. When the secondary lever 274 is rotated to the second manual release position, a lever arm or cam portion 274B of the secondary lever 274 engages a follower portion 28B of the detent lever 28 to drive the detent lever 28 out of engagement with the forkbolt 24. With the detent lever 28 disengaged, the forkbolt 24 can return, for example by spring bias, to the released or open position. Normal operation of the latch 220 may resume without having to perform any destructive acts upon the latch 220, or even partial disassembly of the latch 220 to resolve the condition of a jammed cinching operation. All that may be required to access the manual release lever 266, particularly the socket 70 or other driver portion, is removal or displacement of a vehicle trim panel and/or a dedicated cover or plug of the vehicle or the latch 220 that does not affect the latch functionality. It should be understood that manual operation of the manual release lever 266 as discussed herein refers to manipulation carried out by means other than the designated powered actuator (e.g. motor 46) of the latch 20, including direct or indirect manipulation by human hands. Further, it is noted that the manual release operation or method is accomplished by supplying rotational inputs to the manual release lever 266 about the axis F, which is fixed with respect to any combination or all of: the housing portion 22, the latch frame 42, and the motor 46, for example.

Figure 12:
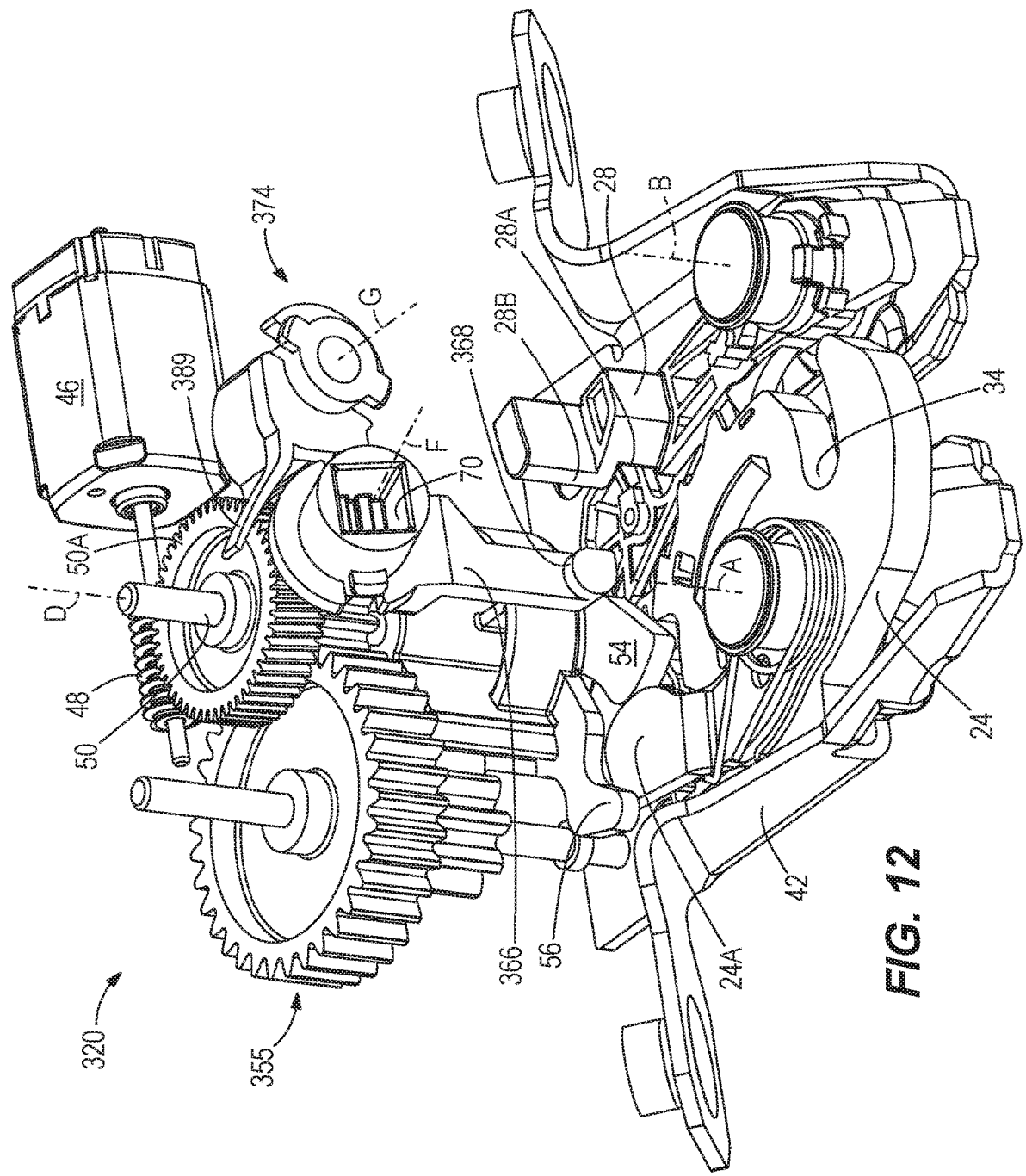
FIG. 12 is a first perspective view of a latching assembly according to another embodiment of the present invention.
Figure 13:
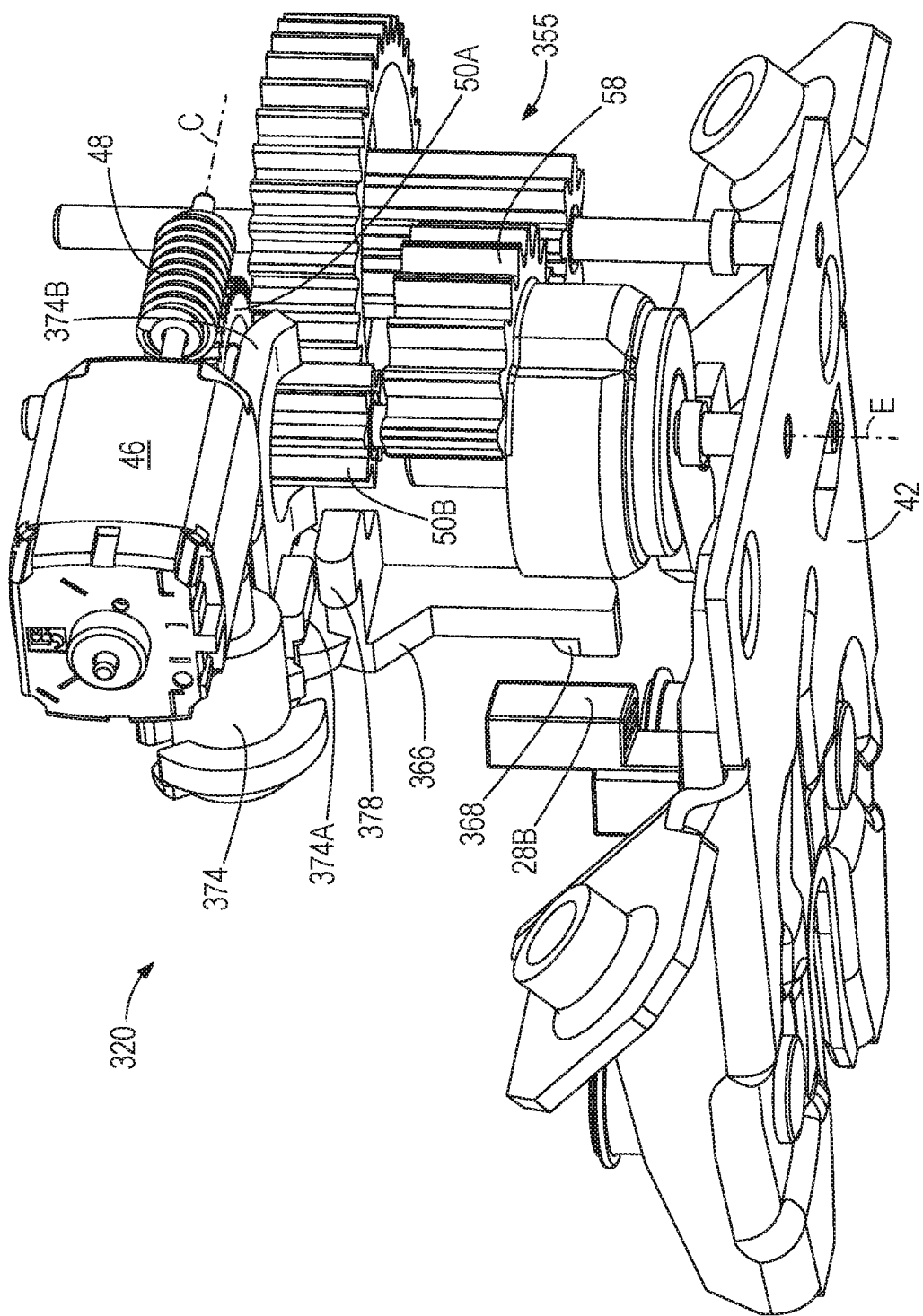
FIG. 13 is a second perspective view of the latching assembly of FIG. 12.

In yet another construction, shown in FIGS. 12-13, a latch 320 is provided that has all the same elements and functional features of the latch 20 of FIGS. 1-6, with the exceptions noted below. For brevity, reference is hereby made to the above description of the features of the latches 20 of FIGS. 1-6. The normal operations of power releasing and power cinching are the same as that of the latch 20, but the latch 320 of FIGS. 12-13 is provided with a unique manual release mechanism. In the latch 320 of FIGS. 12-13, the manual release function is accomplished by a single input action to a manual release mechanism including a manual release lever 366 movable from a first orientation, referred to herein as a home position to a second orientation, referred to herein as a manual release position. The input for manual release can be a rotational input in a single direction (e.g., counter-clockwise rotation of the manual release lever 366 as seen in FIG. 12). The unidirectional rotational input can be supplied from a hand-held tool (not shown) that is engaged with the manual release lever 366, e.g., a tool inserted into a socket 70 of the manual release lever 366. The socket 70, or other driver portion of the manual release lever 366, can be exposed to an exterior of the latch 320, e.g., exposed and accessible through the housing portion 22, as that shown in FIG. 1, for example. Rotation of the manual release lever 366 to the manual release position imparts a corresponding rotation of a secondary manual release lever 374, or simply "secondary lever", in the form of a bell crank. As shown in FIG. 13, the secondary lever 374 can have a follower portion 374A engaged and driven by a cam portion 378 of the manual release lever 366, which can be considered the "primary" manual release lever. When the manual release lever 366 is rotated to the manual release position, the manual release lever 366 and the secondary lever 374 rotate in opposite directions about respective axes F, G. Although the axes F, G are not parallel in this example, they are nearer to parallel than perpendicular, and in other embodiments can be parallel. Generally to the contrary of the latch 20 of FIGS. 1-6, the primary manual release lever 366 is directly responsible for actuating the detent lever 28 from the forkbolt 24 to release the latching thereof, while the secondary manual release lever 374 is directly responsible for interrupting the drive train between the motor 46 and the power cinching lever 54, putting the drive train into a severed or non-drivable state.

In operation, rotation of the manual release lever 366 drives corresponding rotation of the secondary manual release lever 374 to lift the drive shaft 50 along its axis D so that the driving meshed engagement between the motor 46 and the gear 58 of the power cinching and power release levers 54, 56 is de-coupled. It is noted that the de-coupling refers to a de-meshing or physical separation, and not merely to backward driving of the levers and/or gear train of a cinching mechanism. In this illustrated example, the gear train between the motor 46 and the gear 58 is severed or de-coupled by way of at least de-coupling the first toothed portion 50A of the drive shaft 50 from the worm 48. Additional or alternate de-coupling points are optional. It is also noted here that the embodiment illustrated in FIGS. 12-13 includes a layshaft 355 having two gears or toothed portions for transmitting drive torque of the motor 46 from the second toothed portion 50B and to the gear 58. When actuated by rotation of the manual release lever 366, the secondary lever 374 can lift the drive shaft 50 by a pushing or caroming action of a cam portion 374B, against the bias of a spring (not shown). Additionally, in the illustrated embodiment, an additional spring directly biases the secondary manual release lever 374, e.g., against an interior of the latch housing. Although any suitable type and placement of spring can be employed, the illustrated construction utilizes a flexible spring tab 389 integrally formed as a single piece with the secondary manual release lever 374.

In cases where the latch 320 is in a jammed state, the motor 46 must be de-coupled to re-set the latch 320 since the worm 48 and the motor 46 have a high resistance to being back-driven by the gear 58. Rotation of the manual release lever 366 to the manual release position also simultaneously drives a cam portion 368 provided on a lever arm of the manual release lever 366 to engage the follower portion 28B of the detent lever 28 to drive the detent lever 28 out of engagement with the forkbolt 24. With the detent lever 28 disengaged, the forkbolt 24 can return, for example by spring bias, to the released or open position. Normal operation of the latch 320 may resume without having to perform any destructive acts upon the latch 320, or even partial disassembly of the latch 320 to resolve the condition of a jammed cinching operation. All that may be required to access the manual release lever 366, particularly the socket 70 or other driver portion, is removal or displacement of a vehicle trim panel and/or a dedicated cover or plug of the vehicle or the latch 320 that does not affect the latch functionality. It should be understood that manual operation of the manual release lever 366 as discussed herein refers to manipulation carried out by means other than the designated powered actuator (e.g. motor 46) of the latch 320, including direct or indirect manipulation by human hands. Further, it is noted that the manual release operation or method is accomplished by supplying rotational input to the manual release lever 366 about the axis F, which is fixed with respect to any or all of: the housing portion 22, the latch frame 42, and the motor 46, for example.

One particular advantage featured by each of the illustrated embodiments is that the manual release operation, which both interrupts the power transmission path and drives the release of the detent from the forkbolt, is carried out by one or more rotational inputs to the manual release lever 66, 266, 366 provided directly at the rotational axis F of the manual release lever, and no further actions or movements are required. Thus, the operator supplying the manual release input can engage and maintain the handheld tool in a single position with respect to the latch, throughout the manual release because the manual release input is limited to manual rotation about the axis F.

Though illustrated throughout as having a square cross-section engageable by a square-drive tool, the sockets 70 throughout the illustrated embodiments can take other forms as contemplated herein. For example, any or all of the sockets 70 can be provided with a hexagonal cross-section engageable by a commonly known hex wrench or so-called Allen-key. Further, the socket 70 of any or all of the illustrated embodiments can be replaced by one or more slits (e.g., for a flat head or Phillips screwdriver) or a male protrusion or head, which may take the form of a standard hex-shape similar to a bolt head or nut, among many others.

What is claimed is:

1. A powered latch comprising:
    a forkbolt pivotable about a first axis between a latched position for retaining a striker and an unlatched position for releasing the striker;
    a detent lever pivotable about a second axis and engageable with the forkbolt to secure the forkbolt in the latched position;
    a powered actuator;
    a power cinching lever rotatable by the powered actuator through a gear train to cinch the forkbolt to the latched position;
    a power release lever operable to release the detent lever from the forkbolt; and
    a manual release lever supported for rotation about a third axis,
    wherein the manual release lever is operable by a single manual rotation from outside the powered latch, without operation of the powered actuator, to both: drive the gear train between the powered actuator and the power cinching lever out of mesh, and drive the detent lever to release the forkbolt.

2. The powered latch of claim 1, wherein the power release lever and the power cinching lever are fixedly secured for co-rotation.

3. The powered latch of claim 1, wherein a driver portion is provided on the manual release lever to be accessible from outside the powered latch, without disassembly of the powered latch and without destruction of the powered latch.

4. The powered latch of claim 1, wherein the manual release lever is a primary manual release lever, the powered latch further including a secondary manual release lever operable to rotate by rotation of the primary manual release lever.

5. The powered latch of claim 4, wherein the primary manual release lever is operable to drive the detent lever to release the forkbolt through the secondary manual release lever.

6. The powered latch of claim 4, wherein the primary manual release lever includes a first portion operable to drive the secondary manual release lever, and the primary manual release lever includes a second portion operable to drive the detent lever to release the forkbolt.

7. The powered latch of claim 1, wherein the gear train includes a driveshaft including a first toothed portion engaged with the powered actuator and a second toothed portion engaged with the power cinching lever, and wherein the single manual rotation to the manual release lever is operable to push the driveshaft to translate to drive the gear train out of mesh.

8. The powered latch of claim 7, wherein the single manual rotation to the manual release lever is operable to decouple the first toothed portion from the powered actuator and to decouple the second toothed portion from the power cinching lever.

9. The powered latch of claim 1, wherein the manual release lever includes a driver portion provided at the third axis, the driver portion operable to receive the single manual rotation from outside the powered latch.

10. The powered latch of claim 9, wherein the driver portion of the manual release lever includes a socket exposed to an exterior of the powered latch.

11. A powered latch comprising:
    a forkbolt pivotable about a first axis between a latched position for retaining a striker and an unlatched position for releasing the striker;
    a detent lever pivotable about a second axis and engageable with the forkbolt to secure the forkbolt in the latched position;
    a powered actuator;
    a power cinching lever rotatable by the powered actuator through a power transmission path including a gear train to cinch the forkbolt to the latched position, the gear train including at least a first gear and a second gear having respective rotational axes;
    a power release lever operable to release the detent lever from the forkbolt; and
    a manual release mechanism including a primary manual release lever and a secondary manual release lever drivable by the primary manual release lever, wherein the primary manual release lever includes a driver portion positioned at a third axis about which the primary manual release lever is rotatably supported,
    wherein the primary manual release lever is rotatable by a manual rotational input to the driver portion from outside the powered latch, without operation of the powered actuator, to both: interrupt the power transmission path between the powered actuator and the power cinching lever, and drive the detent lever to release the forkbolt, and
    wherein interrupting the power transmission path between the powered actuator and the power cinching lever includes translating the first gear of the gear train along its rotational axis relative to the second gear to de-mesh the first and second gears.

12. The powered latch of claim 11, wherein the power release lever and the cinching lever are fixedly secured for co-rotation.

13. The powered latch of claim 11, wherein the driver portion is formed as a socket.

14. The powered latch of claim 11, wherein the driver portion accessible from outside the powered latch, without disassembly of the powered latch and without destruction of the powered latch.

15. The powered latch of claim 11, wherein the primary manual release lever is operable to drive the detent lever to release the forkbolt through the secondary manual release lever.

16. The powered latch of claim 11, wherein the primary manual release lever includes a first portion operable to drive the secondary manual release lever, and the primary manual release lever includes a second portion operable to drive the detent lever to release the forkbolt.

17. The powered latch of claim 11, wherein the first gear of the gear train is provided by a driveshaft including a first toothed portion engaged with the powered actuator and a second toothed portion engaged with the power cinching lever.

18. The powered latch of claim 17, wherein the manual rotational input to the primary manual release lever is operable to decouple the first toothed portion from the powered actuator and to decouple the second toothed portion from the power cinching lever.

19. The powered latch of claim 11, wherein the manual rotational input operable to both interrupt the power transmission path between the powered actuator and the power cinching lever, and drive the detent lever to release the forkbolt is a unidirectional manual rotational input.

20. The powered latch of claim 11, wherein the manual rotational input operable to both interrupt a power transmission path between the powered actuator and the power cinching lever, and drive the detent lever to release the forkbolt includes a first manual rotational input in a first direction and a second sequential manual rotational input in a second direction opposite the first direction.

\* \* \* \* \*